United States Patent
Wood et al.

(10) Patent No.: US 10,075,402 B2
(45) Date of Patent: Sep. 11, 2018

(54) FLEXIBLE COMMAND AND CONTROL IN CONTENT CENTRIC NETWORKS

(71) Applicant: CISCO TECHNOLOGY, INC., San Jose, CA (US)

(72) Inventors: Christopher A. Wood, Newport Beach, CA (US); Glenn C. Scott, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 407 days.

(21) Appl. No.: 14/749,349

(22) Filed: Jun. 24, 2015

(65) Prior Publication Data

US 2016/0380945 A1   Dec. 29, 2016

(51) Int. Cl.
*H04L 12/58* (2006.01)
*H04L 29/08* (2006.01)
*G06F 8/36* (2018.01)

(52) U.S. Cl.
CPC ............ *H04L 51/18* (2013.01); *H04L 67/327* (2013.01); *H04L 69/30* (2013.01); *G06F 8/36* (2013.01)

(58) Field of Classification Search
None
See application file for complete search history.

(56) References Cited

U.S. PATENT DOCUMENTS

| 817,441 A | 4/1906 | Niesz |
|---|---|---|
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |

(Continued)

FOREIGN PATENT DOCUMENTS

| CN | 103873371 | 6/2014 |
|---|---|---|
| DE | 1720277 A1 | 6/1967 |

(Continued)

OTHER PUBLICATIONS

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

(Continued)

*Primary Examiner* — Jeffrey R Swearingen

(57) ABSTRACT

One embodiment provides a transport-framework system that facilitates command messages to be communicated in a layer-agnostic manner. During operation, the system generates, by a component of a stack of communication modules, a first command message for a target entity. The first command message includes a name unique to the target entity, and the stack does not require a respective communication module to communicate only with a layer above or below thereof. The component sends the first command message to the target entity by inserting the first command message into a queue corresponding to the component. The component can also receive a second command message from a sending entity via a queue corresponding to the sending entity, and the second command message includes a name unique to the component. This facilitates command messages to be communicated in a layer-agnostic manner.

24 Claims, 12 Drawing Sheets

(56) References Cited

U.S. PATENT DOCUMENTS

| | | | |
|---|---|---|---|
| 5,214,702 A | 5/1993 | Fischer | |
| 5,377,354 A | 12/1994 | Scannell | |
| 5,506,844 A | 4/1996 | Rao | |
| 5,629,370 A | 5/1997 | Freidzon | |
| 5,845,207 A | 12/1998 | Amin | |
| 5,870,605 A | 2/1999 | Bracho | |
| 6,021,464 A | 2/2000 | Yao | |
| 6,047,331 A | 4/2000 | Medard | |
| 6,052,683 A | 4/2000 | Irwin | |
| 6,085,320 A | 7/2000 | Kaliski, Jr. | |
| 6,091,724 A | 7/2000 | Chandra | |
| 6,128,623 A | 10/2000 | Mattis | |
| 6,128,627 A | 10/2000 | Mattis | |
| 6,173,364 B1 | 1/2001 | Zenchelsky | |
| 6,209,003 B1 | 3/2001 | Mattis | |
| 6,226,618 B1 | 5/2001 | Downs | |
| 6,233,617 B1 | 5/2001 | Rothwein | |
| 6,233,646 B1 | 5/2001 | Hahm | |
| 6,289,358 B1 | 9/2001 | Mattis | |
| 6,292,880 B1 | 9/2001 | Mattis | |
| 6,332,158 B1 | 12/2001 | Risley | |
| 6,363,067 B1 | 3/2002 | Chung | |
| 6,366,988 B1 | 4/2002 | Skiba | |
| 6,427,171 B1* | 7/2002 | Craft | H04L 29/06 709/230 |
| 6,574,377 B1 | 6/2003 | Cahill | |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,732,273 B1 | 5/2004 | Byers | |
| 6,769,066 B1 | 7/2004 | Botros | |
| 6,772,333 B1 | 8/2004 | Brendel | |
| 6,775,258 B1 | 8/2004 | vanValkenburg | |
| 6,834,272 B1 | 12/2004 | Naor | |
| 6,862,280 B1 | 3/2005 | Bertagna | |
| 6,901,452 B1 | 5/2005 | Bertagna | |
| 6,915,307 B1 | 7/2005 | Mattis | |
| 6,917,985 B2 | 7/2005 | Madruga | |
| 6,957,228 B1 | 10/2005 | Graser | |
| 6,968,393 B1 | 11/2005 | Chen | |
| 6,981,029 B1 | 12/2005 | Menditto | |
| 7,007,024 B2 | 2/2006 | Zelenka | |
| 7,013,389 B1 | 3/2006 | Srivastava | |
| 7,031,308 B2 | 4/2006 | Garcia-Luna-Aceves | |
| 7,043,637 B2 | 5/2006 | Bolosky | |
| 7,061,877 B1 | 6/2006 | Gummalla | |
| 7,080,073 B1 | 7/2006 | Jiang | |
| RE39,360 E | 10/2006 | Aziz | |
| 7,149,750 B2 | 12/2006 | Chadwick | |
| 7,152,094 B1 | 12/2006 | Jannu | |
| 7,177,646 B2 | 2/2007 | ONeill | |
| 7,206,860 B2 | 4/2007 | Murakami | |
| 7,206,861 B1 | 4/2007 | Callon | |
| 7,210,326 B2 | 5/2007 | Kawamoto | |
| 7,233,948 B1 | 6/2007 | Shamoon | |
| 7,246,159 B2 | 7/2007 | Aggarwal | |
| 7,257,837 B2 | 8/2007 | Xu | |
| 7,287,275 B2 | 10/2007 | Moskowitz | |
| 7,315,541 B1 | 1/2008 | Housel | |
| 7,339,929 B2 | 3/2008 | Zelig | |
| 7,350,229 B1 | 3/2008 | Lander | |
| 7,362,727 B1 | 4/2008 | ONeill | |
| 7,382,787 B1 | 6/2008 | Barnes | |
| 7,395,507 B2 | 7/2008 | Robarts | |
| 7,430,755 B1 | 9/2008 | Hughes | |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,535,926 B1 | 5/2009 | Deshpande | |
| 7,542,471 B2 | 6/2009 | Samuels | |
| 7,543,064 B2 | 6/2009 | Juncker | |
| 7,552,233 B2 | 6/2009 | Raju | |
| 7,555,482 B2 | 6/2009 | Korkus | |
| 7,555,563 B2 | 6/2009 | Ott | |
| 7,564,812 B1 | 7/2009 | Elliott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,636,767 B2 | 12/2009 | Lev-Ran | |
| 7,647,507 B1 | 1/2010 | Feng | |
| 7,660,324 B2 | 2/2010 | Oguchi | |
| 7,685,290 B2 | 3/2010 | Satapati | |
| 7,698,463 B2 | 4/2010 | Ogier | |
| 7,698,559 B1 | 4/2010 | Chaudhury | |
| 7,769,887 B1 | 8/2010 | Bhattacharyya | |
| 7,779,467 B2 | 8/2010 | Choi | |
| 7,801,069 B2 | 9/2010 | Cheung | |
| 7,801,177 B2 | 9/2010 | Luss | |
| 7,816,441 B2 | 10/2010 | Elizalde | |
| 7,831,733 B2 | 11/2010 | Sultan | |
| 7,873,619 B1 | 1/2011 | Faibish | |
| 7,908,337 B2 | 3/2011 | Garcia-Luna-Aceves | |
| 7,924,837 B1 | 4/2011 | Shabtay | |
| 7,953,014 B2 | 5/2011 | Toda | |
| 7,953,885 B1 | 5/2011 | Devireddy | |
| 7,979,912 B1 | 7/2011 | Roka | |
| 8,000,267 B2 | 8/2011 | Solis | |
| 8,010,691 B2 | 8/2011 | Kollmansberger | |
| 8,069,023 B1 | 11/2011 | Frailong | |
| 8,074,289 B1 | 12/2011 | Carpentier | |
| 8,117,441 B2 | 2/2012 | Kurien | |
| 8,160,069 B2 | 4/2012 | Jacobson | |
| 8,204,060 B2 | 6/2012 | Jacobson | |
| 8,214,364 B2 | 7/2012 | Bigus | |
| 8,224,985 B2 | 7/2012 | Takeda | |
| 8,225,057 B1 | 7/2012 | Zheng | |
| 8,239,331 B2 | 8/2012 | Shanmugavelayutham | |
| 8,271,578 B2 | 9/2012 | Sheffi | |
| 8,271,687 B2 | 9/2012 | Turner | |
| 8,312,064 B1 | 11/2012 | Gauvin | |
| 8,332,357 B1 | 12/2012 | Chung | |
| 8,375,420 B2 | 2/2013 | Farrell | |
| 8,386,622 B2 | 2/2013 | Jacobson | |
| 8,447,851 B1 | 5/2013 | Anderson | |
| 8,462,781 B2 | 6/2013 | McGhee | |
| 8,467,297 B2 | 6/2013 | Liu | |
| 8,473,633 B2 | 6/2013 | Eardley | |
| 8,553,562 B2 | 10/2013 | Allan | |
| 8,572,214 B2 | 10/2013 | Garcia-Luna-Aceves | |
| 8,654,649 B2 | 2/2014 | Vasseur | |
| 8,665,757 B2 | 3/2014 | Kling | |
| 8,667,172 B2 | 3/2014 | Ravindran | |
| 8,677,451 B1 | 3/2014 | Bhimaraju | |
| 8,688,619 B1 | 4/2014 | Ezick | |
| 8,699,350 B1 | 4/2014 | Kumar | |
| 8,718,055 B2 | 5/2014 | Vasseur | |
| 8,750,820 B2 | 6/2014 | Allan | |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,767,627 B2 | 7/2014 | Ezure | |
| 8,817,594 B2 | 8/2014 | Gero | |
| 8,826,381 B2 | 9/2014 | Kim | |
| 8,832,302 B1 | 9/2014 | Bradford | |
| 8,836,536 B2 | 9/2014 | Marwah | |
| 8,861,356 B2 | 10/2014 | Kozat | |
| 8,862,774 B2 | 10/2014 | Vasseur | |
| 8,868,779 B2 | 10/2014 | ONeill | |
| 8,874,842 B1 | 10/2014 | Kimmel | |
| 8,880,682 B2 | 11/2014 | Bishop | |
| 8,903,756 B2 | 12/2014 | Zhao | |
| 8,923,293 B2 | 12/2014 | Jacobson | |
| 8,934,496 B2 | 1/2015 | Vasseur | |
| 8,937,865 B1 | 1/2015 | Kumar | |
| 8,972,969 B2 | 3/2015 | Gaither | |
| 8,977,596 B2 | 3/2015 | Montulli | |
| 9,002,921 B2 | 4/2015 | Westphal | |
| 9,032,095 B1 | 5/2015 | Traina | |

(56) References Cited

U.S. PATENT DOCUMENTS

| | | |
|---|---|---|
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Paterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |

(56) References Cited

U.S. PATENT DOCUMENTS

| | | |
|---|---|---|
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |

(56) References Cited

U.S. PATENT DOCUMENTS

| | | |
|---|---|---|
| 2013/0047168 A1 | 2/2013 | Shah et al. |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0119367 A1 | 5/2014 | Han et al. |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |

(56) References Cited

FOREIGN PATENT DOCUMENTS

| EP | 2323346 | 5/2011 |
|---|---|---|
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2014023072 | 2/2014 |
| WO | 2014/166551 A1 | 10/2014 |
| WO | 2015084327 | 6/2015 |

OTHER PUBLICATIONS

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]- [006], [0011], [0013]* *figures 1,2*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Microsoft Computer Dictionary, Fifth Edition, 2002, Microsoft Press, p. 23.
Mind—A Brief Introduction, John R. Searle, 2004, Oxford University Press, pp. 62-67.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
A. Broder and A. Karlin, "Multilevel Adaptive Hashing", Jan. 1990, pp. 43-53.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Cho, Jin-Hee, Ananthram Swami, and Ray Chen. "A survey on trust management for mobile ad hoc networks." Communications Surveys & Tutorials, IEEE 13.4 (2011): 562-583.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
Fayazbakhsh, S. K., Lin, Y., Tootoonchian, A., Ghodsi, A., Koponen, T., Maggs, B., & Shenker, S. (Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
Jacobson, Van et al., "Content-Centric Networking, Whitepaper Describing Future Assurable Global Networks", Palo Alto Research Center, Inc., Jan. 30, 2007, pp. 1-9.
Jacobson et al., "Custodian-Based Information Sharing," Jul. 2012, IEEE Communications Magazine: vol. 50 Issue 7 (p. 3843).
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.

(56) References Cited

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Walfish, H. Balakrishnan, and S. Shenker, "Untangling the web from DNS," in Proc. USENIX NSDI 2004, Oct. 2010, pp. 735-737.
Matocha, Jeff, and Tracy Camp. 'A taxonomy of distributed termination detection algorithms.' Journal of Systems and Software 43.3 (1998): 207-221.
Merindol et al., "An efficient algorithm to enable path diversity in link state routing networks", Jan. 10, Computer Networks 55 (2011), pp. 1132-1140.
Narasimhan, Sriram, and Lee Brownston. "HyDE—A General Framework for Stochastic and Hybrid Modelbased Diagnosis." Proc. DX 7 (2007): 162-169.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
Rosenberg, J. "Interactive Connectivity Establishment (ICE): A Protocol for Network Address Translator (NAT) Traversal for Offer/Answer Protocols", Apr. 2010, pp. 1-117.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, Lixia, et al. 'Named data networking.' ACM SIGCOMM Computer Communication Review 44.3 {2014): 66-73.
D. Trossen and G. Parisis, "Designing and realizing and information-centric internet," IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Extended European Search Report and Written Opinion in counterpart European Application No. 16174077.4, dated Oct. 24, 2016, 6 pages.

\* cited by examiner

FLEXIBLE COMMAND AND CONTROL IN CONTENT CENTRIC NETWORKS

RELATED APPLICATIONS

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

U.S. patent application Ser. No. 14/595,060, entitled "AUTO-CONFIGURABLE TRANSPORT STACK," by inventors Ignacio Solis and Glenn C. Scott, filed 12 Jan. 2015 (hereinafter "U.S. patent application Ser. No. 14/595,060"); and U.S. patent application Ser. No. 14/746,490, entitled "TRANSPORT STACK NAME SCHEME AND IDENTITY MANAGEMENT," by inventors Christopher Wood and Glenn C. Scott, filed 22 Jun. 2015 (hereinafter "U.S. patent application Ser. No. 14/746,490");

the disclosures of which are herein incorporated by reference in their entirety.

BACKGROUND

Field

This disclosure is generally related to a transport framework. More specifically, this disclosure is related to a method and system for facilitating command messages to be communicated in a layer-agnostic manner between components of the same or different stacks.

Related Art

The ubiquitous nature of mobile computing devices and the Internet is making it possible for people to experience digital content from anywhere. People can use applications in their mobile computing devices to consume or interact with content from service providers across the Internet, such as to stream movies or music or to play games with others. These advances in mobile computing are also increasing the quality of content that can be reproduced by these mobile devices and greatly increases the number of devices that can generate and capture digital content and share with others over the Internet. Nowadays, even small mobile devices such as smartphones can produce full high-definition video with high-quality color reproduction, and high-speed cellular and broadband networks make it possible for users to share this content with others over various Internet services, such as the YouTube (from Google, Inc.) and Facebook (from Facebook, Inc.) content-sharing services.

Many computer applications leverage these computer networks and Internet services to provide social features to its users, which greatly enhances the user experience. When an application wants to use the network, it does so by using one or more Application Programming Interfaces (APIs) that run on the computing device's operating system. These APIs provide a way for applications to send, receive, store, configure data or otherwise communicate with other computers across the network.

For example, an application instantiates a protocol stack that implements a network API before the application can use the API to send or receive data over the network. In a traditional protocol stack based on, e.g., the Open Systems Interconnection (OSI) model, each layer can only communicate with the layer above or below it. In a model based on a content-centric network (CCN), a protocol stack can be dynamically created to suit the needs of APIs used by various applications. While the creation of these application-driven protocol stacks can increase the flexibility of a system, the lack of standardization presents challenges in addressing specific components within such a stack. Furthermore, some messages may be associated with a specific direction of flow within a stack, which can result in decreased flexibility.

SUMMARY

One embodiment provides a transport-framework system that facilitates command messages to be communicated in a layer-agnostic manner. During operation, the system generates, by a component of a stack of communication modules, a first command message for a target entity. The first command message includes a name unique to the target entity, and the stack does not require a respective communication module to communicate only with a layer above or below thereof. The component sends the first command message to the target entity by inserting the first command message into a queue corresponding to the component. The component can also receive a second command message from a sending entity via a queue corresponding to the sending entity. The second command message includes a name unique to the component. This facilitates command messages to be communicated in a layer-agnostic manner.

In some embodiments, the target entity and the sending entity are one or more of: another component of the stack; a component of another stack; an API instance associated with an application corresponding to the stack; an API instance associated with an application corresponding to another stack; a forwarder associated with the stack; and a forwarder associated with another stack.

In some embodiments, sending the first command message further comprises sending the first command message via a message delivery system to the target entity.

In some embodiments, responsive to determining that the target entity is another component of the stack, a component of another stack, an API instance associated with an application corresponding to another stack, or a forwarder associated with another stack, the system sets an upward or downward output queue for the component as the queue corresponding to the component. Responsive to determining that the target entity is an API instance associated with an application corresponding to the stack, the system sets the upward output queue for the component as the queue corresponding to the component. Responsive to determining that the target entity is a forwarder associated with the stack, the system sets the downward output queue for the component as the queue corresponding to the component.

In some embodiments, receiving the second command message further comprises receiving the second command message via a message delivery system from the sending entity.

In some embodiments, the second command message is received via an upward or downward input queue associated with the sending entity.

In some embodiments, the name for the first or second command message includes one or more of: a name for the stack; a name for a forwarder associated with a corresponding portal instance; a name for a component of the stack; and a command associated with a component of the stack.

In some embodiments, a name for a component of the stack is based on one or more of: a hierarchically structured variable length identifier (HSVLI) which comprises contiguous name components ordered from a most general level to a most specific level, wherein the HSVLI is applicable in a portal instance corresponding to the stack; a flat name that does not indicate any hierarchy; a role of the component of the stack; and a unique identifier which is specific to the component of the stack.

BRIEF DESCRIPTION OF THE FIGURES

In the figures, like reference numerals refer to the same figure elements.

DETAILED DESCRIPTION

Figure 1:
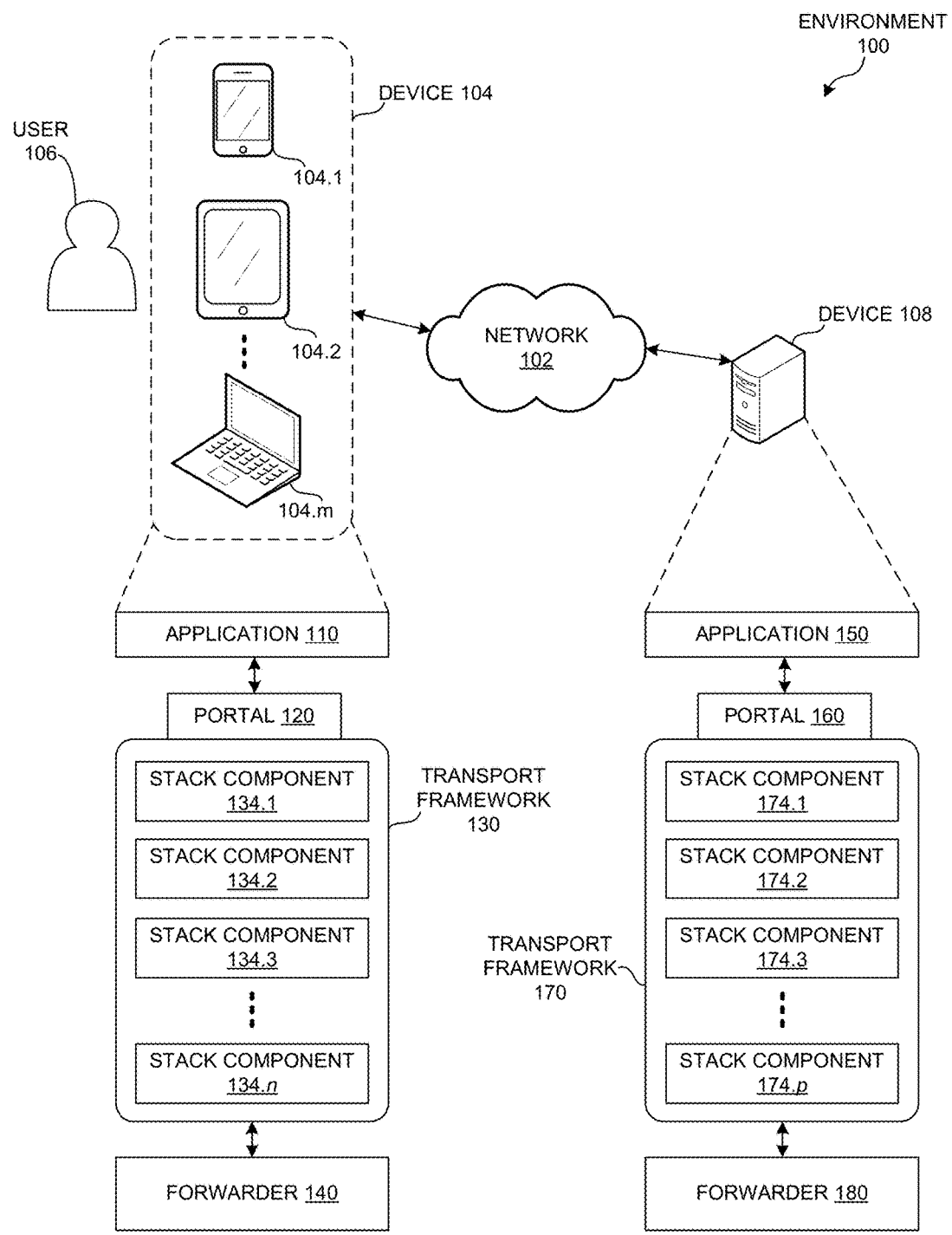
FIG. 1 illustrates an exemplary environment which facilitates command messages to be communicated in a layer-agnostic manner, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a message passing scheme for a transport framework which solves the problem of imposing a fixed direction to messages originated by a component in a layered protocol stack or an application by allowing layer-agnostic command messages to be sent between applications, forwarders, and individual components of the same stack or different stacks. In CCN, the transport framework enables high-level APIs to instantiate a transport stack within the framework. The transport stack can include multiple components or communication modules, and does not adhere to a traditional layered model (e.g., OSI) where each component communicates only with the layer below or above it. The transport stack can be created dynamically and configured at runtime, where each of the components within the transport stack performs a specific function. For example, one component of the transport stack can be a flow controller which is responsible for implementing a Transmission Control Protocol (TCP) congestion avoidance algorithm (e.g., TCP Vegas) for a high-level message stream API.

Typically, to configure a stack component, an API can generate a "control" message directed to the stack component. The control message is similar to an interest or content object in that it is identified by a CCN name and includes a payload. The control message flows down the stack through the stack components in sequence by layer until it reaches the intended recipient, which generates and sends a response (e.g., in the form of an ACK or NACK with accompanying metadata such as an error code or success message). Conversely, an individual stack component can issue a "notification" message directed to an upper-level component or API. Similar to the control message, the notification message is identified by a CCN name, flows up the stack in sequence by layer until it reaches the intended recipient, and triggers a response.

The rigidity imposed by the flow of these separate types of messages (e.g., control messages from API to stack component, and notification messages from stack component to API) can result in decreased flexibility in the overall transport framework. Embodiments of the present invention provide a system in which uniform, layer-agnostic command messages (including both control messages and notification messages) can be sent from an application/API, stack component, or a forwarder to any other application/API, stack component, or forwarder associated with the same or a different stack, on the same or a different device. The command messages can flow up or down the stack based on the direction specified by the originator and a unique naming scheme. A transport stack name scheme and identity management is described in U.S. patent application Ser. No. 14/746,490, which is herein incorporated by reference. Providing uniform command messages based on the naming scheme removes the directional dependence of standard "downward" flowing control messages and "upward" flowing notification messages. Thus, in a dynamically configured and non-standard layered CCN transport stack, the system facilitates the construction and communication of command messages in a layer-agnostic manner.

In some embodiments, the transport framework operates under the CCN architecture. In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "Content Object"):

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847, 814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "Interest"):

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In addition, "lci" refers to labeled content information and is a Universal Resource Indicator (URI) compliant identifier in which name segments carry a label. Network protocols such as CCN can use labeled content information by applying specific labels to each name segment of a URI. In a hierarchically structured name, a labeled content name assigns a semantic type or label to each segment. For example, a type of name segment can include a name segment which is a generic name segment that includes arbitrary octets, which allows a CCN to use a binary on-the-wire representation for messages.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1 illustrates an exemplary environment 100 which facilitates command messages to be communicated in a layer-agnostic manner, in accordance with an embodiment of the present invention. Computing environment 100 can include a computer network 102, such as a CCN. Environment 100 can also include a user 106 associated with a local computing device 104, and a remote computing device 108. Devices 104 and 108 can have internal transport stacks (e.g., associated with transport frameworks 130 and 170, respectively) that exchange network packets with each other over network 102.

In a traditional IP architecture, a forwarder is an IP-based forwarder that looks at the header of a packet to determine the source and the destination for the packet, and forwards the packet to the destination. The stack performs TCP/UDP, and an application interacts with the stack via a socket. In contrast, device 104 of the present invention does not use a conventional "stack." Rather, device 104 via application 110 can request a portal API instance corresponding to a portal 120 which corresponds to transport framework 130. Similarly, device 108 via application 150 can request a portal API instance corresponding to a portal 160 which corresponds to transport framework 170. Applications 110 and 150 can generate requests to retrieve or create the portal API instances associated with portals 120 and 160, respectively. Alternatively, a root user associated with device 104 or device 108 can create the respective portal instances, as described in U.S. patent application Ser. No. 14/746,490, which is herein incorporated by reference. Applications 110 and 150 can reside on different devices (as shown in FIG. 1) or on the same device (not shown in FIG. 1).

Device 104 can include any computing device coupled to network 102, such as a smartphone 104.1, a tablet computer 104.2, and/or a server or personal computer 104.m. Specifically, device 104 can include application 110 which communicates via portal 120 with transport framework 130. Transport framework 130 can include stack components 134.1-134.n. Device 104 can also include forwarder 140 (e.g., a network interface card, or a router in a local area network) which can transfer packets between a stack (and individual stack components) of transport framework 130 and network 102. Similarly, device 108 can include any computing device coupled to network 102, such as a server or an end host device. Device 108 can include application 150 which communicates via portal 160 with transport framework 170. Transport framework 170 can include stack components 174.1-174.p. Device 108 can also include a forwarder 180 which can transfer packets between a stack (and individual stack components) of transport framework 170 and network 102. Forwarders 140 and 180 can also facilitate the transfer of packets directly between individual stack components 134.1-134.n and 174.1-174.p, respectively.

Figure 2A:
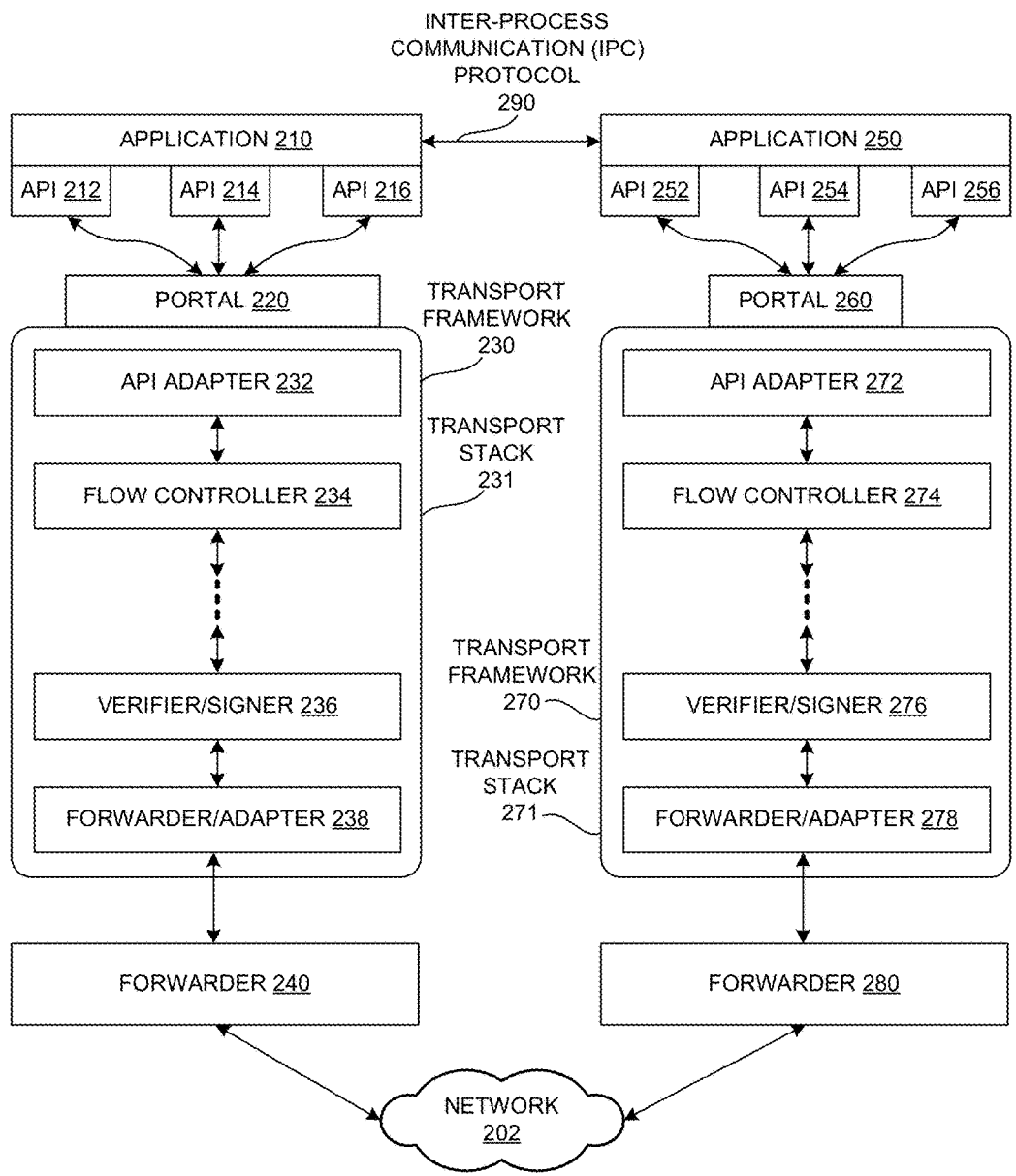
FIG. 2A illustrates an exemplary transport framework, in accordance with an embodiment of the present invention.

FIG. 2A illustrates an exemplary transport framework, in accordance with an embodiment of the present invention. Applications 210 and 250 can reside on the same device, or on different devices which communicate via a network 202. Application 210 can use APIs 212, 214, and 216 to communicate over network 202, and APIs 212-216 can interact via a portal 220 with a transport framework 230. Transport framework 230 can include one or more transport stacks which each include multiple stack components or communication modules. In FIG. 2A, transport framework 230 depicts one transport stack (e.g., a transport stack 231) which includes stack components 232-238. An API adapter 232 can communicate between an API and a specific transport stack and transport framework 230. A flow controller 234 can shape and manage traffic, pipeline and transmit interests, and order content objects. A verifier/signer 236 can encode and sign content objects destined for a network element, decode and verify content objects destined for an associated application, encode interests destined for a network element, and decode interests destined for an associated application. A forwarder/adapter 238 can communicate with a forwarder 240. Forwarder 240 can communicate with other forwarders over network 202. Other stack components (not shown) can include functionality related to security (e.g., encryption, decryption, authentication, data signing, signature verification, trust assessment, and filtering), data-processing (e.g., encoding, decoding, encapsulating, decapsulating, transcoding, compression, extraction, and decompression), and storage (e.g., data storage, data retrieval from storage, deduplication, segmentation, and versioning).

Similarly, application 250 can use APIs 252, 254, and 256 to communicate over network 202, and APIs 252-256 can interact via a portal 260 with a transport framework 270. Transport framework 270 can include one or more transport stacks which each include multiple stack components or communication modules. In FIG. 2A, transport framework 270 depicts one transport stack (e.g., a transport stack 271) which includes the following stack components: an API adapter 272; a flow controller 274; a verifier/signer 276; and a forwarder/adapter 278 which can communicate with a forwarder 280. Forwarder 240 can communicate with forwarder 280 over network 202.

The system (via a request from an application or a root user operation or a runtime executable) can create a portal API instance associated with each CCN transport stack. Upon creation of the portal instance, an application or any individual stack component can send a message directly to any other individual component of the same or another stack, as described in U.S. patent application Ser. No. 14/746,490, which is herein incorporated by reference. For example, application 210 can request a portal API instance associated with transport stack 231, which includes components 232-238. By using the naming scheme (e.g., the unique names or identifiers obtained upon creating or retrieving the portal API instance), application 210 or any component of transport stack 231 can send a command message directly to any other component of stack 231 or stack 271. Similar to applications 210 and 250, transport stacks 231 and 271 can reside on the same device, or on different devices which communicate via network 202. In addition, applications 210 and 250 can communicate via an inter-process communication (IPC) protocol 290.

Exemplary Communication Between Stack Components, Applications, and Forwarders Associated with the Same Stack (Intra-Stack Communication)

Figure 2B:
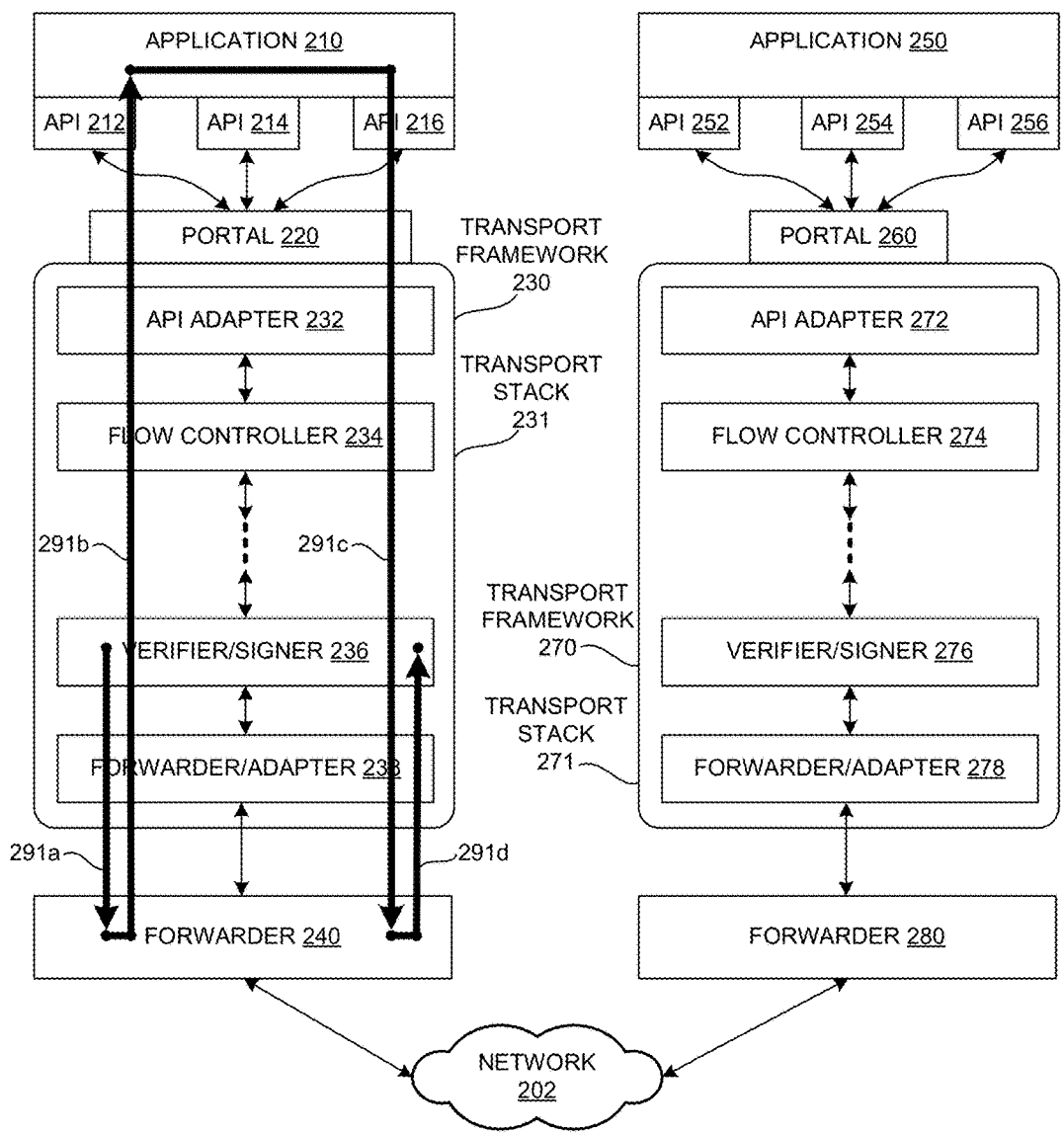
FIG. 2B illustrates a conventional exemplary communication between a component of a stack and an application associated with the same stack.

FIG. 2B illustrates a conventional exemplary communication between a component of a stack and an application associated with the same stack. Verifier/signer 236 can issue a "notification" message to application 210 via, e.g., API 214. In a traditional layered protocol stack, verifier signer 236 creates an interest with a name, and the interest travels down through the stack components until it reaches forwarder 240 (flow 291a), which determines that application 210 via API 214 is the target entity for the interest. Forwarder 240 sends the interest to application 210, and the interest travels back up through the stack components by layer until it reaches application 210 (flow 291b). Upon receiving the interest, application 210 generates a content object or similar response (such as an ACK or NACK) in response to the interest, and sends the response back down the stack through the stack components by layer until it reaches forwarder 240 (flow 291c). Forwarder 240 receives the response, determines that it is destined for verifier/signer 236, and forwards the response to verifier/signer 236 by sending the response back up the stack through the stack components until it reaches verifier/signer 236 (flow 291d). The conventional flow of the notification message in this stack relies on the forwarder to properly route the notification message to the application via the associated API.

Figure 2C:
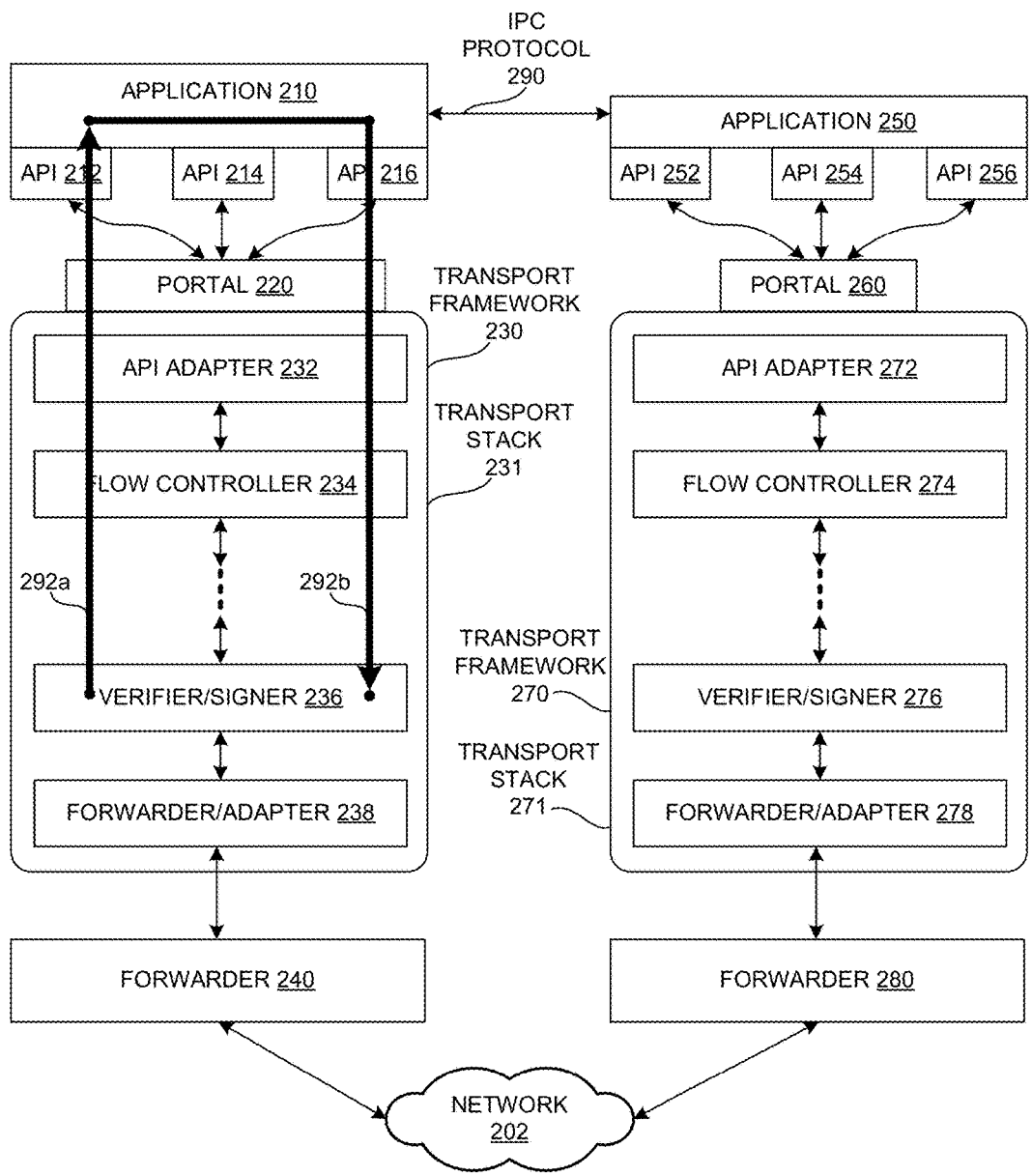
FIG. 2C illustrates an exemplary communication between a component of a stack and an application associated with the same stack, in accordance with an embodiment of the present invention.

FIG. 2C illustrates an exemplary communication between a component of a stack and an application associated with the same stack, in accordance with an embodiment of the present invention. Messages that travel within a single stack can be referred to as "intra-stack messages." During operation, verifier/signer 236 can generate an event or a notification command message (with a name that follows the unique naming scheme and a payload that carries the relevant command or message). For example, the name for the message can be based on a unique identifier of the API instance:

$$\text{lci:/API\_name="API 214 Instance"} \quad (1)$$

Verifier/signer 236 can propagate the message upwards to application 210 (flow 292a) via a message delivery system that dynamically dispatches or routes the command message to the destined entity. The message delivery system is described below in relation to FIG. 3. Application 210 generates a response or a content object in response to the message, and sends the response back to verifier/signer 236 (flow 292b). Thus, as shown in FIG. 2C, the transport framework of the present invention does not rely solely on the forwarder to properly route messages from an individual stack component to an application via an associated API.

Figure 2D:
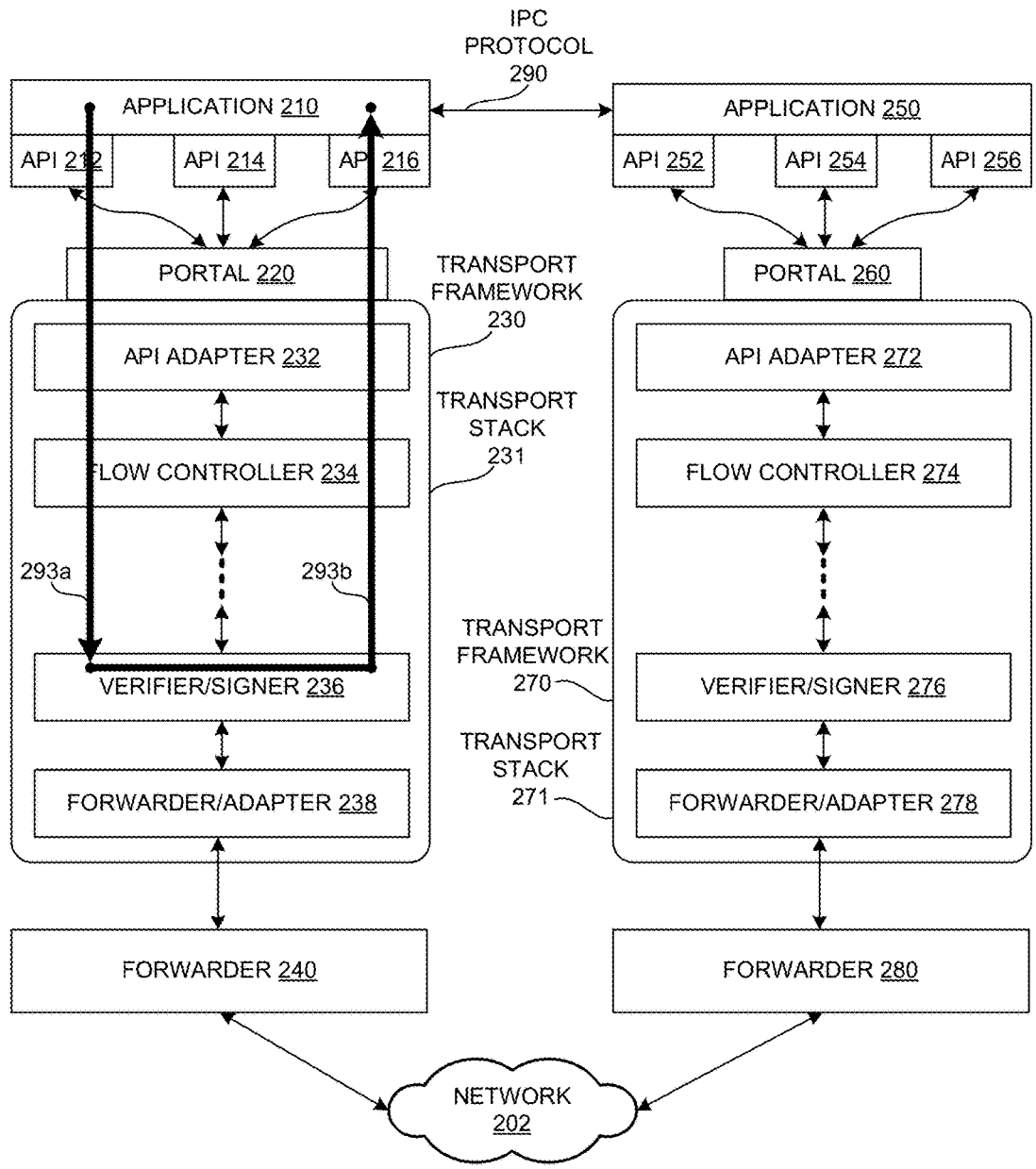
FIG. 2D illustrates an exemplary communication between a component of a stack and an application associated with the same stack, in accordance with an embodiment of the present invention.

FIG. 2D illustrates an exemplary communication between a component of a stack and an application associated with the same stack, in accordance with an embodiment of the present invention. During operation, application 210 can issue a control command message requesting verification of a content object. Application 210 can create the command message destined for verifier/signer 236 based on a unique name that specifically identifies verifier/signer 236. For example, the name for the message can be:

$$\text{lci:/stack\_name="Portal 220 Stack"/} \\ \text{component\_name="Verifier/Signer 236"/} \\ \text{command="VERIFY\_CONT\_OBJ"} \quad (2)$$

Application 210 can propagate the message downwards to verifier/signer 236 (flow 293a) via the message delivery system, as described below in relation to FIG. 3. Verifier/signer 236 receives the message, performs the requested action (e.g., verifies the content object), and sends a response (e.g., of a successful verification) back to application 210 (flow 293b). Similar to the communication depicted in FIG. 2B, the communication shown in FIG. 2C does not rely solely upon the forwarder to properly route command messages from an application to an individual stack component.

Exemplary Communication Between Stack Components, Applications, and Forwarders Associated with Different Stacks (Inter-Stack Communication)

An individual component of a stack can send a message to a component of another stack, based on the unique naming scheme and the message passing scheme described herein. Messages that pass between two different stacks can be referred to as "inter-stack messages." The different stacks can reside on the same device or on different devices. Note that the direction of the flow of these inter-stack messages is neither fixed nor relevant because both the high-level API instances and the low-level forwarders are capable of routing inter-stack messages to the destined entity in either direction (e.g., through the forwarders, as described below in relation to FIG. 2E, and through the applications, as described below in relation to FIG. 2F).

Figure 2E:
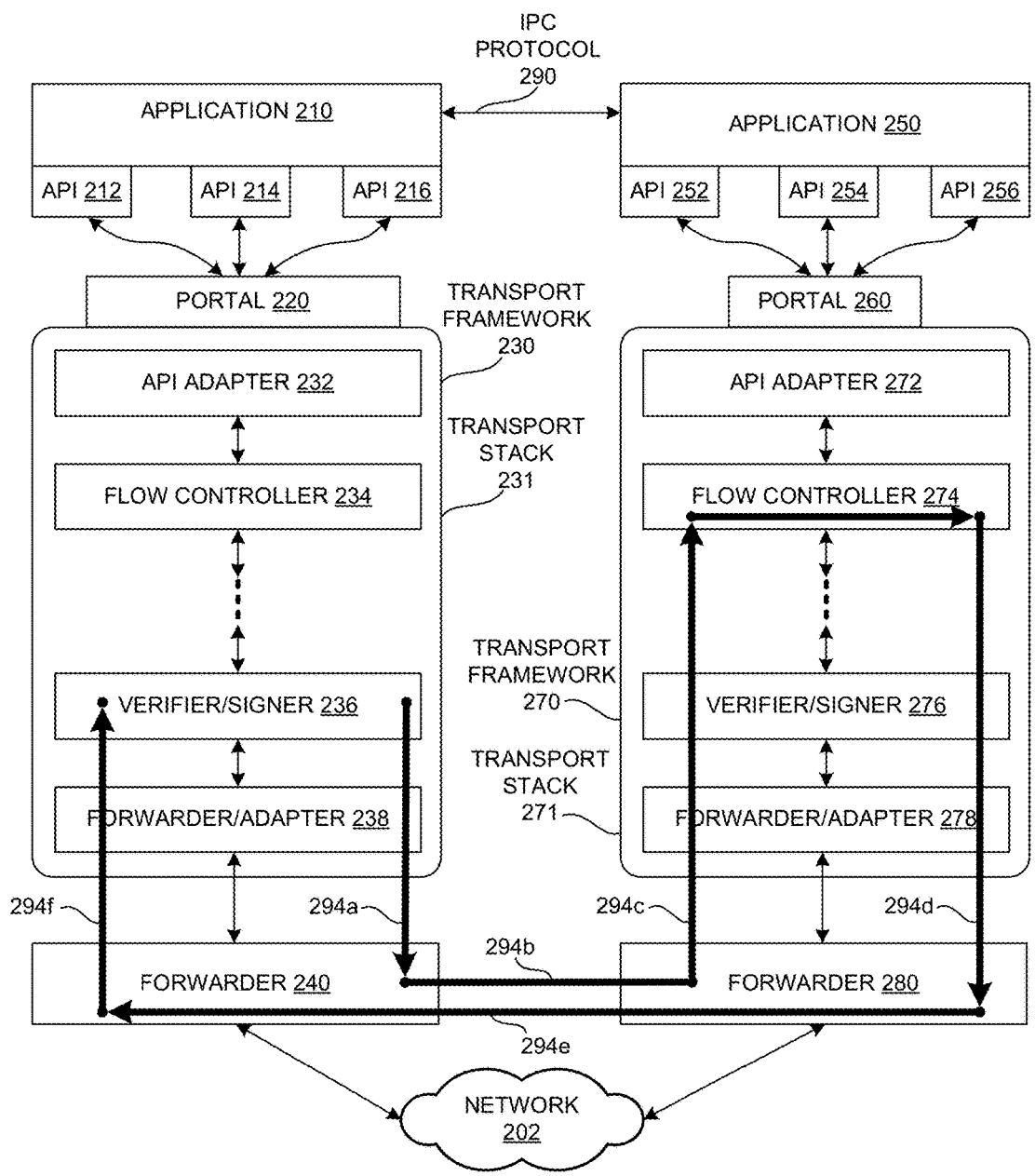
FIG. 2E illustrates an exemplary communication between components of different stacks, in accordance with an embodiment of the present invention.

FIG. 2E illustrates an exemplary communication between components of different stacks, in accordance with an embodiment of the present invention. During operation, verifier/signer 236 of transport stack 231 can send a command message to flow controller 274 of transport stack 271. The message can be travel through the forwarders (e.g., forwarders 240 and 280) associated with the respective transport stacks. Verifier/signer 236 generates the message and propagates the message downwards to forwarder 240 via a message delivery system for transport framework 230 ("first message delivery system") (flow 294a). The message includes a name which uniquely identifies the target entity (e.g., flow controller 274), and can also include a command (e.g., to turn off flow controller 274). For example, the name for the message can be:

```
lci:/stack_name="Portal 260 Stack"/
    component_name="Flow Controller 274"/
    command="TURN_OFF"                          (3)
```

Upon receiving the message, forwarder 240 transmits the message to forwarder 280 over network 202 (flow 294b). Forwarder 280 receives the message, determines that the message is destined for flow controller 274, and propagates the message up to flow controller 274 via a message delivery system for transport framework 270 ("second message delivery system") (flow 294c). Flow controller 274 receives the message, generates a response, and sends the response back to forwarder 280 via the second message delivery system (flow 294d). Upon receiving the response, forwarder 280 transmits the response back to forwarder 240 (again, over network 202) (flow 294e). Finally, forwarder 240 receives and routes the response to verifier signer 236 via the first message delivery system (flow 294f).

Figure 2F:
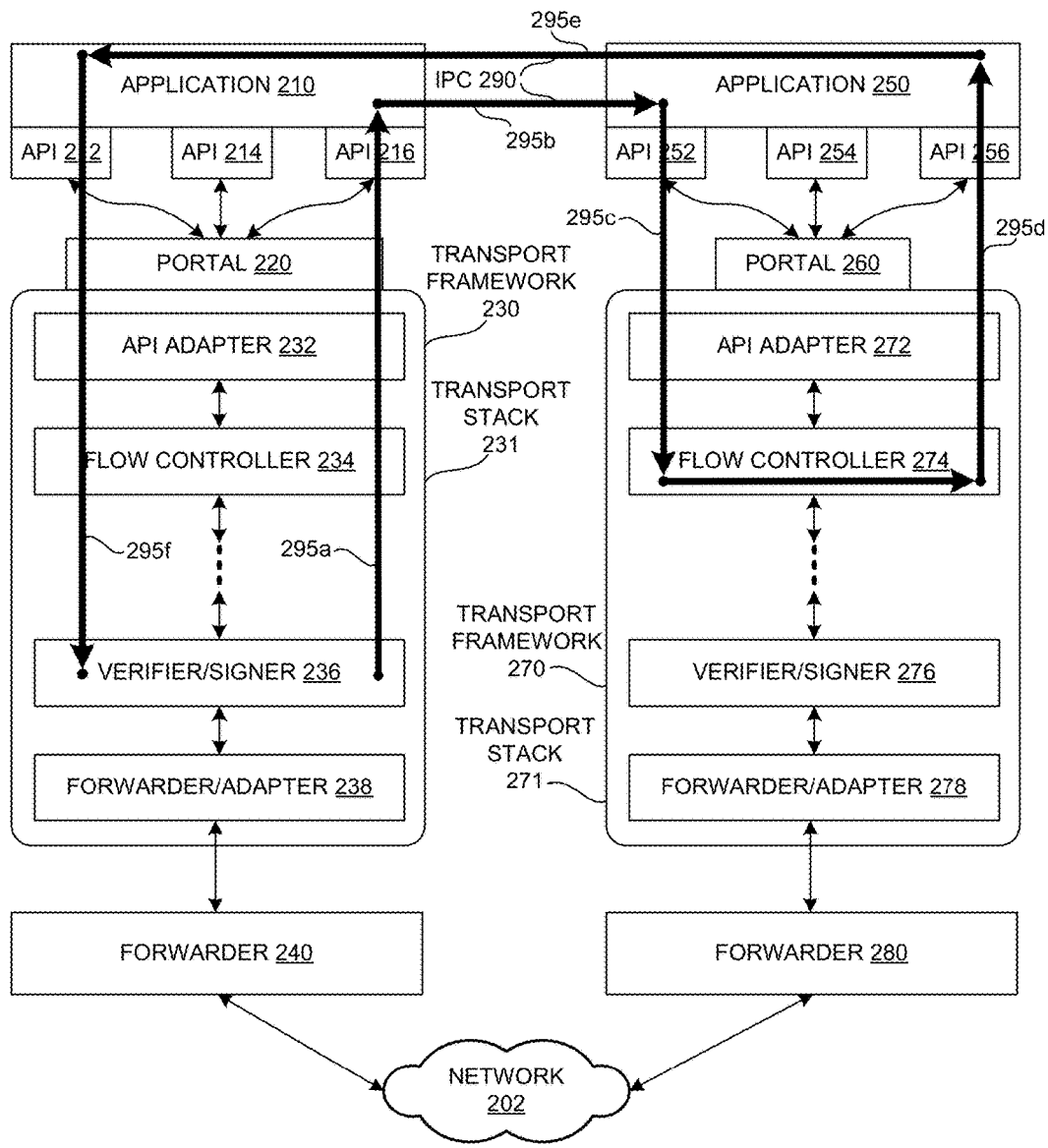
FIG. 2F illustrates an exemplary communication between components of different stacks, in accordance with an embodiment of the present invention.

FIG. 2F illustrates an exemplary communication between components of different stacks, in accordance with an embodiment of the present invention. During operation, verifier/signer 236 of transport stack 231 can send a command message to flow controller 274 of transport stack 271. The message can travel through the applications and APIs associated with the respective transport stacks. Verifier/signer 236 generates an event or a command message that propagates upwards to application 210 via the first message delivery system (flow 295a). Similar to the communication depicted in FIG. 2E, the message includes a name which uniquely identifies the target entity and can also include a command, as in Name (3). Application 210 transmits the message to application 250 via IPC protocol 290 (flow 295b). Upon receiving the message, application 250 sends the message (e.g., by generating an interest) to flow controller 274 via the second message delivery system (flow 295c). Upon receiving the interest (which includes in its payload a command to turn off the target entity), flow controller 274 turns itself off, generates a response (e.g., an ACK), and sends the response back to application 250 via the second message delivery system (flow 295d). Application 250 sends the response back to application 210 via IPC protocol 290 (flow 295e), and application 210 sends the response to verifier/signer 236 via the first message delivery system (flow 295f).

Exemplary Transport Framework With Message Delivery System

Figure 3:
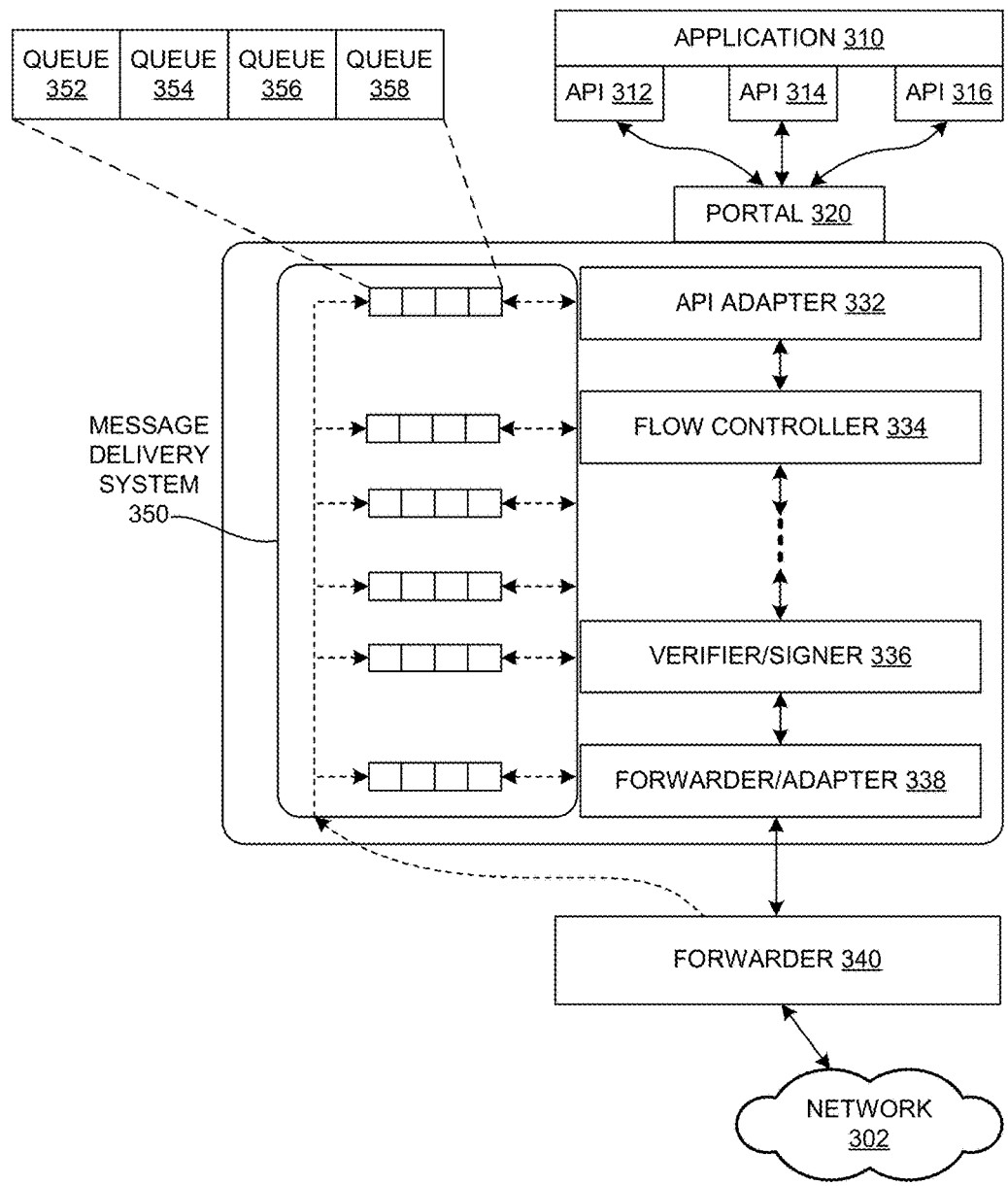
FIG. 3 illustrates an exemplary transport framework, including a message delivery system, in accordance with an embodiment of the present invention.

FIG. 3 illustrates an exemplary transport framework, including a message delivery system, in accordance with an embodiment of the present invention. An application 310 can use APIs 312, 314, and 316 to communicate over a network 302, and APIs 312-316 can interact via a portal 320 with a transport stack which can include the following stack components: an API adapter 332; a flow controller 334; a verifier/signer 336; and a forwarder/adapter 338 which can communicate with a forwarder 340. The transport framework can include a message delivery system 350 which dynamically dispatches or routes a message to a target entity. Message delivery system 350 can include a single thread which retrieves values (e.g., commands) from queues associated with each stack component and performs scheduling operations to process the commands associated with each queue. Each stack component can be associated with multiple queues. For example, API adapter 332 can be associated with a downward input queue 352, an upward input queue 354, a downward output queue 356, and an upward output queue 358. In some embodiments, message delivery system 350 can include a data structure based on a name and value pair, where the name is the name of an individual stack component, and the value is the content of each queue associated with the individual stack component.

Examples of message flow via a message delivery system and queues associated with stack components are described in relation to FIGS. 2C-2F. Corresponding to FIG. 2C, verifier/signer 236 can insert the notification command message into its upward output queue, allowing the message delivery system (e.g., the single thread) to retrieve and propagate the message upwards towards the API. Corresponding to FIG. 2D, application 210 can insert the control command message into the downward input queue of API adapter 232 (as shown by queue 352 of FIG. 3). Corresponding to FIG. 2E, verifier/signer 236 can insert the command message into its downward output queue (to enable flow 294a), forwarder 280 can insert the command message into the upward input queue of forwarder/adapter 278 (to enable flow 294c), flow controller 274 can insert the command message into its downward output queue (to enable flow 294d), and forwarder 240 can insert the command message into the upward input queue of forwarder/adapter 238 (to enable flow 294f). Corresponding to FIG. 2F, verifier/signer 236 can insert the command message into its upward output queue (to enable flow 295a), application 250 can insert the command message into the downward input queue of API adapter 272 (to enable flow 295c), flow controller 274 can insert the command message into its upward output queue (to enable flow 295d), and application 210 can insert the command message into the downward input queue of API adapter 232 (to enable flow 295f).

Method for Communicating Command Messages

Figure 4A:
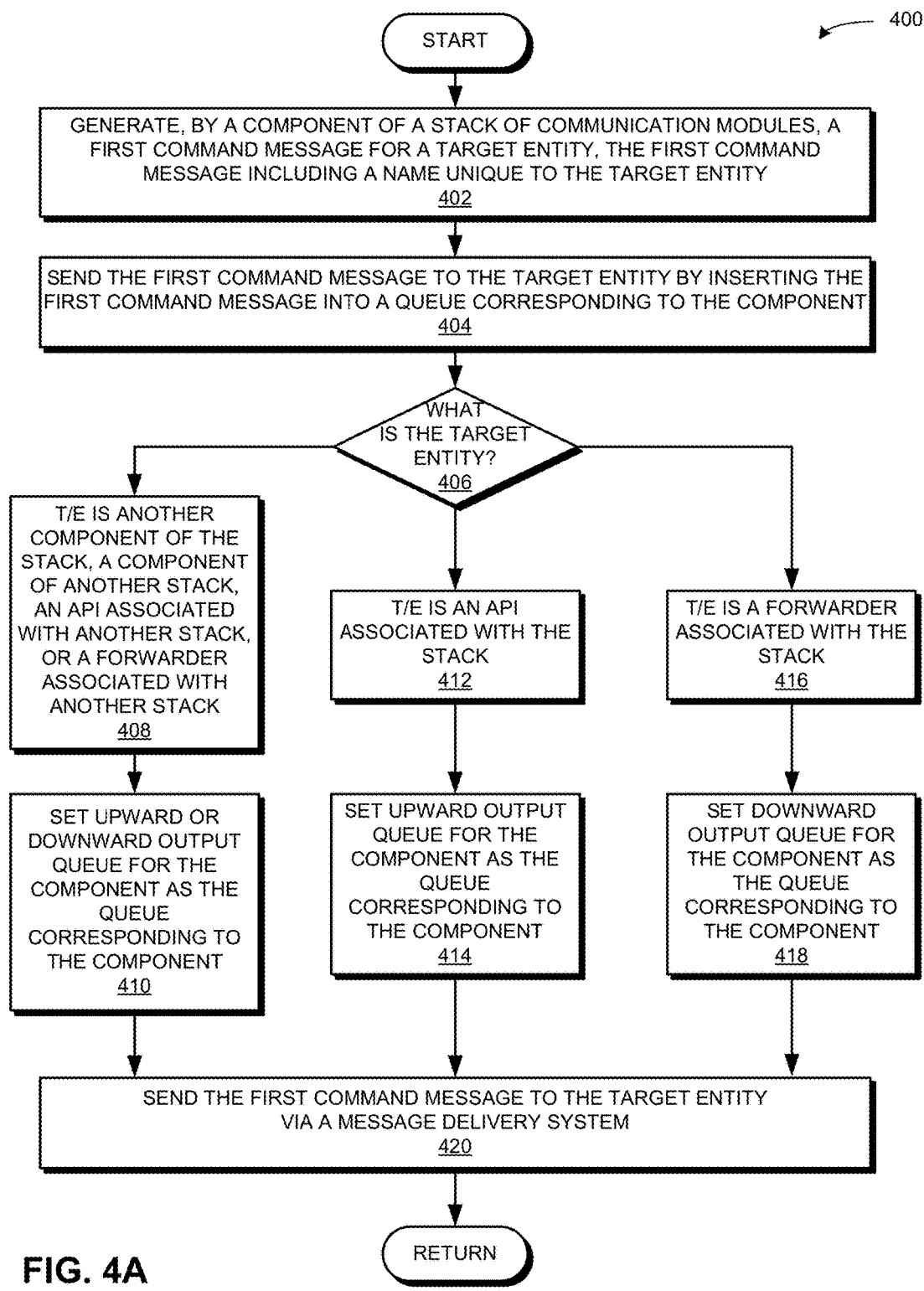
FIG. 4A presents a flow chart illustrating a method for facilitating command messages to be communicated in a layer-agnostic manner, in accordance with an embodiment of the present invention.

FIG. 4A presents a flow chart 400 illustrating a method for facilitating command messages to be communicated in a layer-agnostic manner, in accordance with an embodiment of the present invention. During operation, the system generates, by a component of a stack of communication modules, a first command message for a target entity, where the first command message includes a name unique to the target entity (operation 402). The stack does not require a respective communication module to communicate only with a layer above or below thereof. The stack component sends the first command message to the target entity by inserting the first command message into a queue corresponding to the component (operation 404). The system determines the target entity (decision 406). If the system determines that the target entity is another component of the stack, a component of another stack, an API associated with another stack, or a forwarder associated with another stack (operation 408), the system sets an upward or downward output queue for the component as the queue corresponding to the component (operation 410). If the system determines that the target entity is an API associated with the stack (operation 412), the system sets an upward output queue for the component as the queue corresponding to the component (operation 414). If the system determines that the target entity is a forwarder associated with the stack (operation 416), the system sets a downward output queue for the component as the queue corresponding to the component (operation 418). Subsequently, the stack component sends the first command message to the target entity via a message delivery system (operation 420).

Figure 4B:
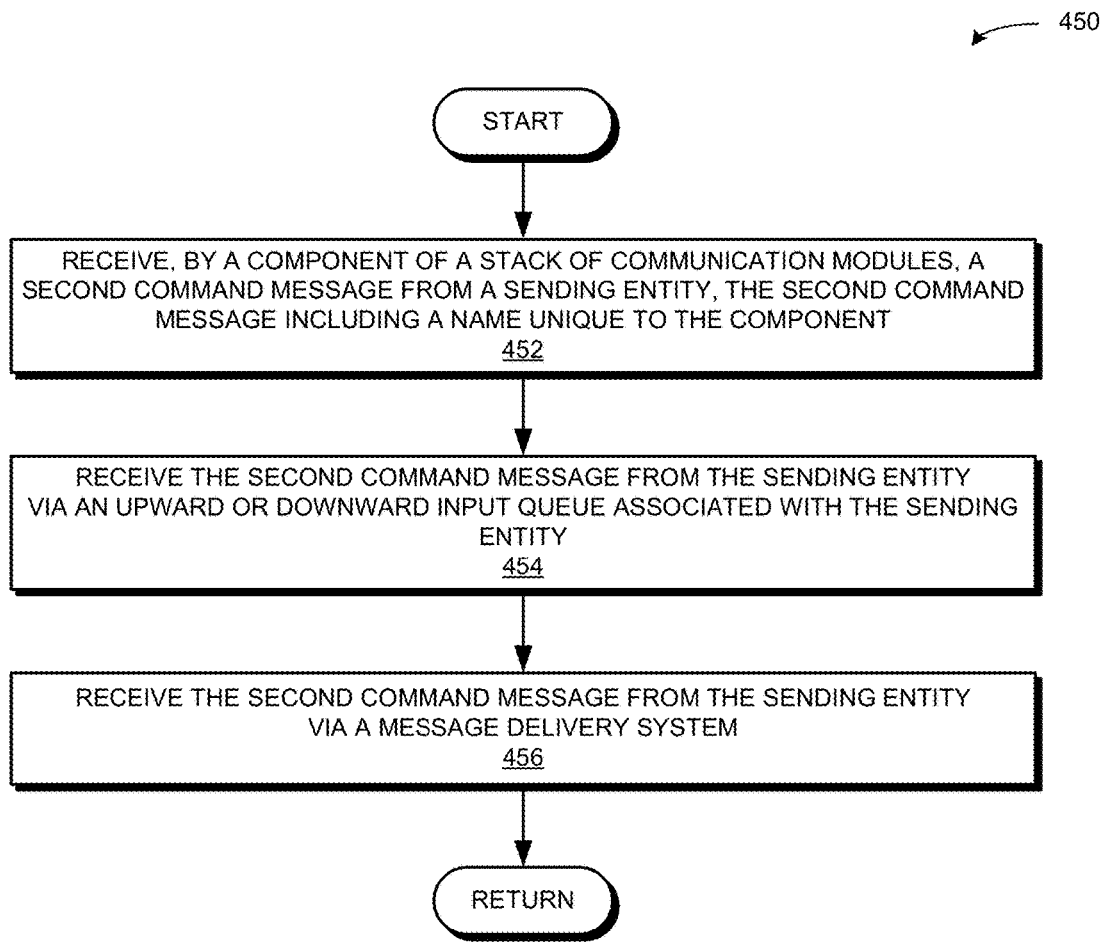
FIG. 4B presents a flow chart illustrating a method for facilitating command messages to be communicated in a layer-agnostic manner, in accordance with an embodiment of the present invention.

FIG. 4B presents a flow chart 450 illustrating a method for facilitating command messages to be communicated in a layer-agnostic manner, in accordance with an embodiment of the present invention. During operation, the system receives, by a component of a stack of communication modules, a second command message from a sending entity, where the second command message includes a name unique to the component (operation 452). The stack component receives the second command message from the sending entity via an upward or downward input queue associated with the sending entity (operation 454). A queue can be associated with an entity when the queue corresponds to a stack component that plays a role in communicating between an entity and another stack component. For example, corresponding to FIG. 2D, verifier/signer 236 (e.g., the stack component) receives the command message from application 210 (e.g., the sending entity) via a downward input queue of API adapter 232 (e.g., the queue associated with the sending entity). In another example corresponding to FIG. 2E, flow controller 274 (e.g., the stack component) receives the command message from forwarder 280 (e.g., the sending entity) via an upward input queue of forwarder/adapter 278 (e.g., the queue associated with the sending entity). Subsequently, the stack component receives the second command message from the sending entity via a message delivery system (operation 456).

Exemplary Apparatus and Computer System

Figure 5:
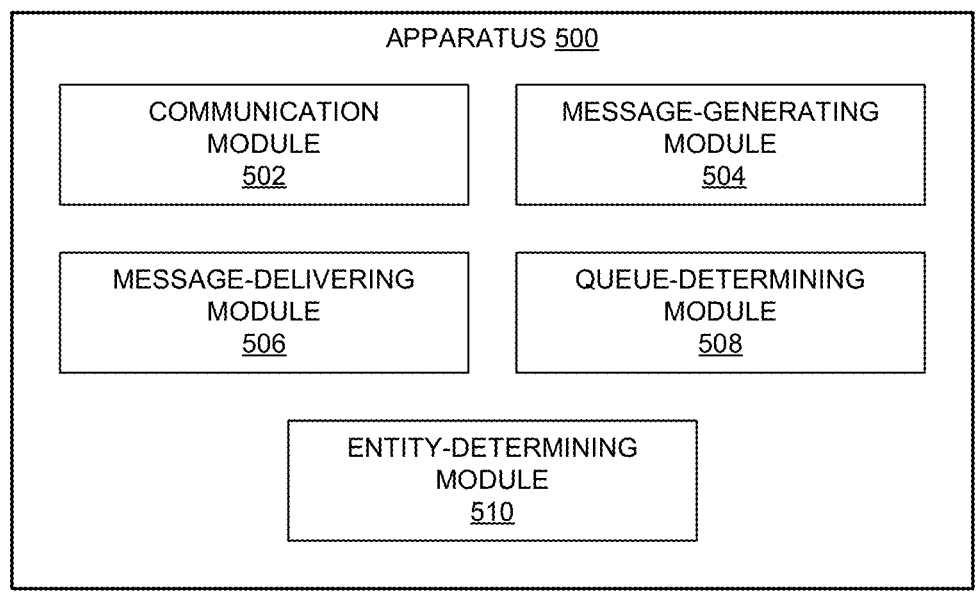
FIG. 5 illustrates an exemplary apparatus that facilitates command messages to be communicated in a layer-agnostic manner, in accordance with an embodiment of the present invention.

FIG. 5 illustrates an exemplary apparatus 500 that facilitates command messages to be communicated in a layer-agnostic manner, in accordance with an embodiment of the present invention. Apparatus 500 can comprise a plurality of modules which may communicate with one another via a wired or wireless communication channel. Apparatus 500 may be realized using one or more integrated circuits, and may include fewer or more modules than those shown in FIG. 5. Further, apparatus 500 may be integrated in a computer system, or realized as a separate device which is capable of communicating with other computer systems and/or devices. Specifically, apparatus 500 can comprise a communication module 502, a message-generating module 504, a message-delivering module 506, a queue-determining module 508, and an entity-determining module 510.

In some embodiments, communication module 502 can send and/or receive data packets to/from other network nodes across a computer network, such as a content centric network. Message-generating module 504 can generate a first command message for a target entity. Message-delivering module 506 can send the first command message to the target entity by inserting the first command message into a queue corresponding to a component, and can further send the first command message via a message delivery system to the target entity. Communication module 502 can also receive a second command message from a sending entity via a queue corresponding to the sending entity, and can further receive the second command message via a message delivery system from the sending entity.

Entity-determining module 510 can determine that the target entity is another component of the stack, a component of another stack, an API instance associated with an application corresponding to another stack, a forwarder associated with another stack, an API instance associated with an application corresponding to the stack, or a forwarder associated with the stack. Responsive to determining that the target entity is another component of the stack, a component of another stack, an API instance associated with an application corresponding to another stack, or a forwarder associated with another stack, queue-determining module 508 can set an upward or downward output queue for the component as the queue corresponding to the component. Responsive to determining that the target entity is an API instance associated with an application corresponding to the stack, queue-determining module 508 can set the upward output queue for the component as the queue corresponding to the component. Responsive to determining that the target entity is a forwarder associated with the stack, queue-determining module 508 can set the downward output queue for the component as the queue corresponding to the component.

Figure 6:
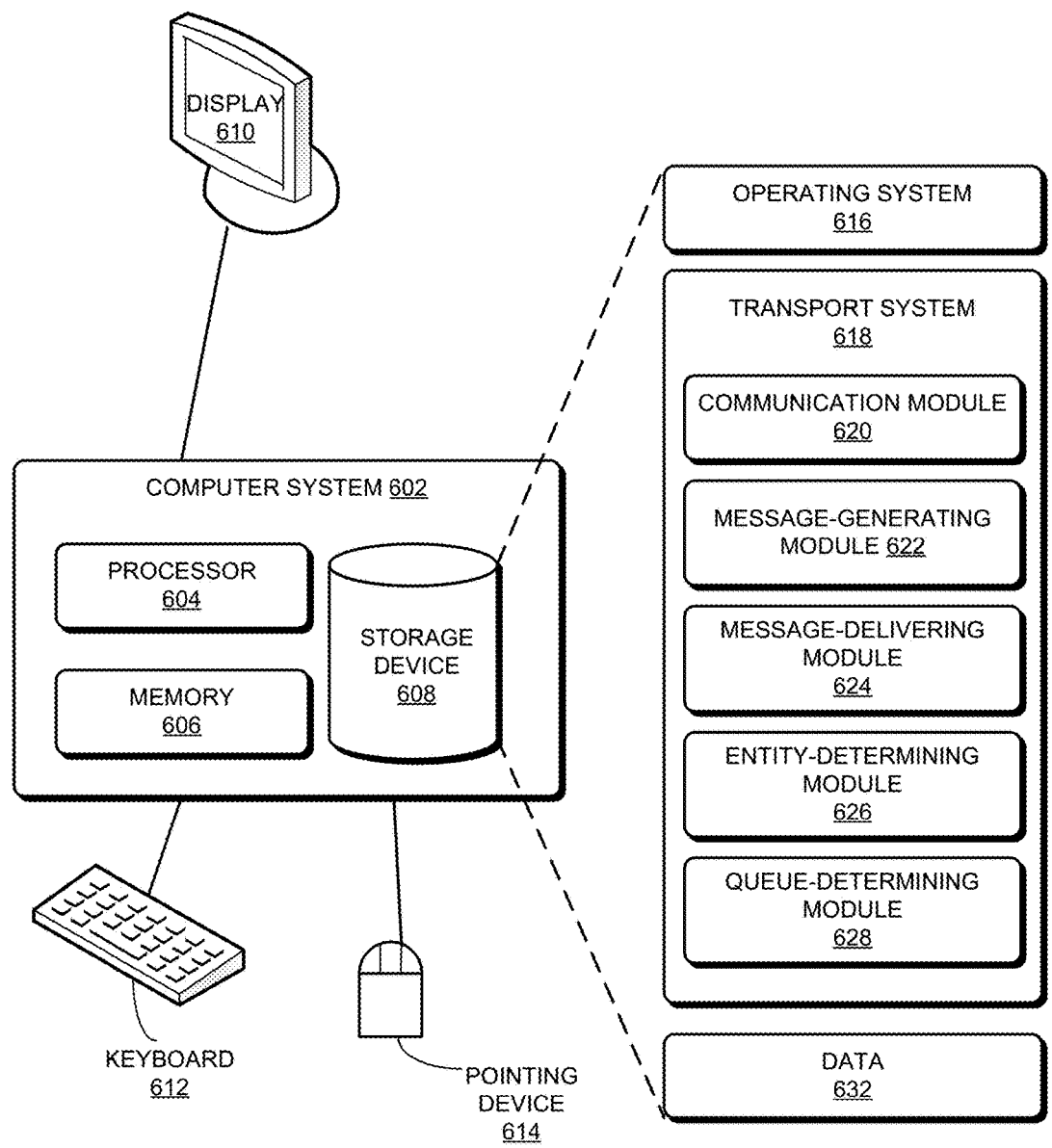
FIG. 6 illustrates an exemplary computer system that facilitates command messages to be communicated in a layer-agnostic manner, in accordance with an embodiment of the present invention.

FIG. 6 illustrates an exemplary computer system 602 that facilitates command messages to be communicated in a layer-agnostic manner, in accordance with an embodiment of the present invention. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a transport system 618, and data 632.

Transport system 618 can include instructions, which when executed by computer system 602 or processor 604, can cause computer system 602 or processor 604 to perform methods and/or processes described in this disclosure. Specifically, transport system 618 may include instructions for sending and/or receiving data packets to/from other network nodes across a computer network, such as a content centric network (communication module 620). Transport system 618 can also include instructions for generating a first command message for a target entity (message-generating module 622). Transport system 618 can include instructions for sending the first command message to the target entity by inserting the first command message into a queue corresponding to a component, and for sending the first command message via a message delivery system to the target entity (message-delivering module 624). Transport system 618 can include instructions for receiving a second command message from a sending entity via a queue corresponding to the sending entity, and for receiving the second command message via a message delivery system from the sending entity (communication module 620).

Furthermore, transport system 618 can include instructions for determining that the target entity is another component of the stack, a component of another stack, an API instance associated with an application corresponding to another stack, a forwarder associated with another stack, an API instance associated with an application corresponding to the stack, or a forwarder associated with the stack (entity-determining module 626). Transport system 618 can also include instructions for, responsive to determining that the target entity is another component of the stack, a component of another stack, an API instance associated with an application corresponding to another stack, or a forwarder associated with another stack, setting an upward or downward output queue for the component as the queue corresponding to the component (queue-determining module 628). Transport system 618 can also include instructions for, responsive to determining that the target entity is an API instance associated with an application corresponding to the stack, setting the upward output queue for the component as the queue corresponding to the component (queue-determining module 628). Transport system 618 can further include instructions for, responsive to determining that the target entity is a forwarder associated with the stack, setting the downward output queue for the component as the queue corresponding to the component (queue-determining module 628).

Data 632 can include any data that is required as input or that is generated as output by the methods and/or processes described in this disclosure. Specifically, data 632 can store at least: a first command message for a target entity, where the first command message includes a name unique to the target entity; a second command message from a sending entity, where the second command includes a name unique to the component; a data packet that corresponds to an event, a command, a notification, a control message, an interest, or a content object; a transport framework; a protocol or transport stack; one or more components of a transport or protocol stack; a portal or portal API instance associated with a transport or protocol stack; and a forwarder associated with a transport or protocol stack.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
generating, by a module of a network stack of communication modules, a first command message for a target entity, the first command message including a name unique to the target entity, wherein the network stack enables a respective communication module to communicate with a layer that is not directly above or directly below the respective communication module;
sending the first command message, via a message delivery system, to the target entity by inserting the first command message into a queue corresponding to the module, wherein the message delivery system uses the name unique to the target entity and a value that represents content of the queue corresponding to the module; and
receiving a second command message from a sending entity via a queue corresponding to the sending entity, the second command message including a name unique to the component module.

2. The method of claim 1, wherein the target entity and the sending entity are one or more of:
another module of the network stack;
a module of another network stack;
an API instance associated with an application corresponding to the network stack;
an API instance associated with an application corresponding to another network stack;
a forwarder associated with the network stack; and
a forwarder associated with another network stack.

3. The method of claim 1, wherein sending the first command message further comprises:
sending the first command message via a message delivery system to the target entity.

4. The method of claim 1, wherein the method further comprises:
responsive to determining that the target entity is another module of the network stack, a module of another network stack, an API instance associated with an application corresponding to another network stack, or a forwarder associated with another network stack, setting an upward or downward output queue for the module as the queue corresponding to the module;
responsive to determining that the target entity is an API instance associated with an application corresponding to the network stack, setting the upward output queue for the module as the queue corresponding to the module; and
responsive to determining that the target entity is a forwarder associated with the network stack, setting the downward output queue for the module as the queue corresponding to the module.

5. The method of claim 1, wherein receiving the second command message further comprises:
receiving the second command message via a message delivery system from the sending entity.

6. The method of claim 1, wherein the second command message is received via an upward or downward input queue associated with the sending entity.

7. The method of claim 1, wherein the name for the first or second command message includes one or more of:
a name for the network stack;

a name for a forwarder associated with a corresponding portal instance;
a name for a module of the network stack; and
a command associated with a module of the network stack.

8. The method of claim 1, wherein a name for a module of the network stack is based on one or more of:
a hierarchically structured variable length identifier (HSVLI) which comprises contiguous name module ordered from a most general level to a most specific level, wherein the HSVLI is applicable in a portal instance corresponding to the network stack;
a flat name that does not indicate any hierarchy;
a role of the module of the network stack; and
a unique identifier which is specific to the module of the network stack.

9. A non-transitory computer-readable storage medium storing instructions that when executed by a computer cause the computer to perform a method, the method comprising:
generating, by a module of a network stack of communication modules, a first command message for a target entity, the first command message including a name unique to the target entity, wherein the network stack enables a respective communication module to communicate with a layer that is not directly above or directly below the respective communication module;
sending the first command message, via a message delivery system, to the target entity by inserting the first command message into a queue corresponding to the module, wherein the message delivery system uses the name unique to the target entity and a value that represents content of the queue corresponding to the module; and
receiving a second command message from a sending entity via a queue corresponding to the sending entity, the second command message including a name unique to the module.

10. The storage medium of claim 9, wherein the target entity and the sending entity are one or more of:
another module of the network stack;
a module of another network stack;
an API instance associated with an application corresponding to the network stack;
an API instance associated with an application corresponding to another network stack;
a forwarder associated with the network stack; and
a forwarder associated with another network stack.

11. The storage medium of claim 9, wherein sending the first command message further comprises:
sending the first command message via a message delivery system to the target entity.

12. The storage medium of claim 9, wherein the method further comprises:
responsive to determining that the target entity is another module of the network stack, a module of another network stack, an API instance associated with an application corresponding to another network stack, or a forwarder associated with another network stack, setting an upward or downward output queue for the module as the queue corresponding to the module;
responsive to determining that the target entity is an API instance associated with an application corresponding to the network stack, setting the upward output queue for the module as the queue corresponding to the module; and
responsive to determining that the target entity is a forwarder associated with the network stack, setting the downward output queue for the module as the queue corresponding to the module.

13. The storage medium of claim 9, wherein receiving the second command message further comprises:
receiving the second command message via a message delivery system from the sending entity.

14. The storage medium of claim 9, wherein the second command message is received via an upward or downward input queue associated with the sending entity.

15. The storage medium of claim 9, wherein the name for the first or second command message includes one or more of:
a name for the network stack;
a name for a forwarder associated with a corresponding portal instance;
a name for a module of the network stack; and
a command associated with a module of the network stack.

16. The storage medium of claim 1, wherein a name for a module of the network stack is based on one or more of:
a hierarchically structured variable length identifier (HSVLI) which comprises contiguous name modules ordered from a most general level to a most specific level, wherein the HSVLI is applicable in a portal instance corresponding to the network stack;
a flat name that does not indicate any hierarchy;
a role of the module of the network stack; and
a unique identifier which is specific to the module of the network stack.

17. A computer system for facilitating forwarding of packets, the system comprising:
a processor; and
a storage device storing instructions that when executed by the processor cause the processor to perform a method, the method comprising:
generating, by a module of a network stack of communication modules, a first command message for a target entity, the first command message including a name unique to the target entity, wherein the network stack enables a respective communication module to communicate with a layer that is not directly above or directly below the respective communication module;
sending the first command, via a message delivery system, message to the target entity by inserting the first command message into a queue corresponding to the module, wherein the message delivery system uses the name unique to the target entity and a value that represents content of the queue corresponding to the module; and
receiving a second command message from a sending entity via a queue corresponding to the sending entity, the second command message including a name unique to the module.

18. The computer system of claim 17, wherein the target entity and the sending entity are one or more of:
another module of the network stack;
a module of another network stack;
an API instance associated with an application corresponding to the network stack;
an API instance associated with an application corresponding to another network stack;
a forwarder associated with the network stack; and
a forwarder associated with another network stack.

19. The computer system of claim 17, wherein sending the first command message further comprises:
sending the first command message via a message delivery system to the target entity.

20. The computer system of claim 17, wherein the method further comprises:

responsive to determining that the target entity is another module of the network stack, a module of another network stack, an API instance associated with an application corresponding to another network stack, or a forwarder associated with another network stack, setting an upward or downward output queue for the module as the queue corresponding to the module;

responsive to determining that the target entity is an API instance associated with an application corresponding to the network stack, setting the upward output queue for the module as the queue corresponding to the module; and responsive to determining that the target entity is a forwarder associated with the network stack, setting the downward output queue for the module as the queue corresponding to the module.

21. The computer system of claim 17, wherein receiving the second command message further comprises:

receiving the second command message via a message delivery system from the sending entity.

22. The computer system of claim 17, wherein the second command message is received via an upward or downward input queue associated with the sending entity.

23. The computer system of claim 17, wherein the name for the first or second command message includes one or more of:

a name for the network stack;

a name for a forwarder associated with a corresponding portal instance;

a name for a module of the network stack; and a command associated with a module of the network stack.

24. The computer system of claim 17, wherein a name for a module of the network stack is based on one or more of:

a hierarchically structured variable length identifier (HSVLI) which comprises contiguous name modules ordered from a most general level to a most specific level, wherein the HSVLI is applicable in a portal instance corresponding to the network stack;

a flat name that does not indicate any hierarchy;

a role of the module of the network stack; and a unique identifier which is specific to the module of the network stack.

* * * * *

UNITED STATES PATENT AND TRADEMARK OFFICE
CERTIFICATE OF CORRECTION

PATENT NO. : 10,075,402 B2
APPLICATION NO. : 14/749349
DATED : September 11, 2018
INVENTOR(S) : Christopher A. Wood et al.

It is certified that error appears in the above-identified patent and that said Letters Patent is hereby corrected as shown below:

In the Claims

Claim 1, Column 14, Line 25, remove "component"

Signed and Sealed this
Twenty-ninth Day of January, 2019

Andrei Iancu
*Director of the United States Patent and Trademark Office*